J. H. BONHAM.
Seed-Planter.
No. 1,001. Reissued July 10. 1860.
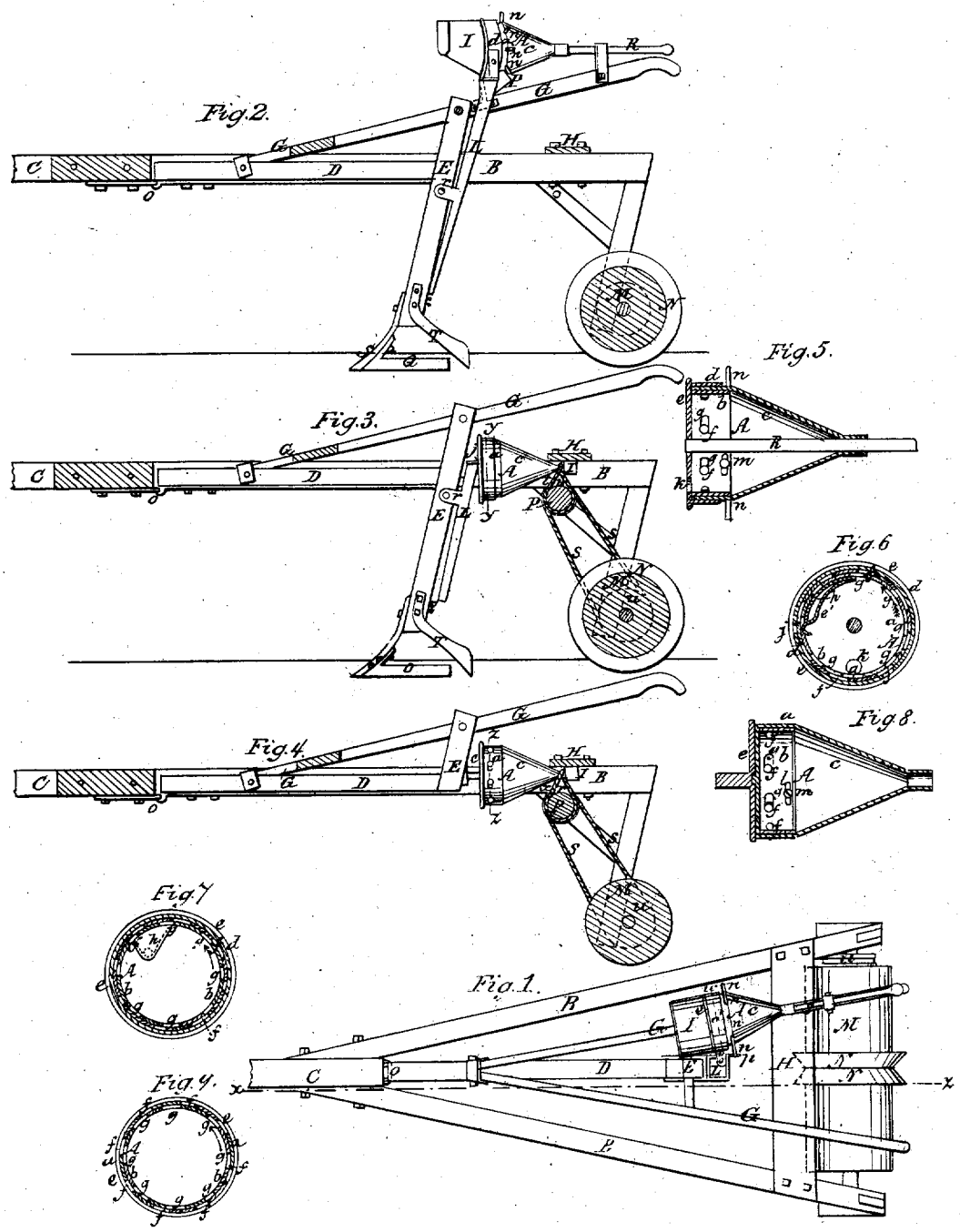
N. PETERS, PHOTO-LITHOGRAPHER, WASHINGTON, D. C.

UNITED STATES PATENT OFFICE.

A. E. BONHAM, OF ELIZABETHTOWN, OHIO, ADMINISTRATOR OF THE ESTATE OF J. H. BONHAM, DECEASED.

IMPROVEMENT IN SEEDING-MACHINES.

Specification forming part of Letters Patent No. 18,798, dated December 8, 1857; Reissue No. 1,001, dated July 10, 1860.

*To all whom it may concern:*

Be it known that J. H. BONHAM, late of Elizabethtown, in the county of Hamilton and State of Ohio, did invent a new and Improved Machine for Planting and Sowing Corn and other Seeds; and I, A. E. BONHAM, of Elizabethtown, in the county of Hamilton and State of Ohio, administrator of the estate of the said J. H. BONHAM, deceased, do hereby declare that the following is a full and exact description thereof, reference being had to the accompanying drawings, making part of this specification—

Figure 1 being a plan of the machine arranged especially for planting in hills; Fig. 2, a longitudinal vertical section thereof in the plane indicated by the line *x x*, Fig. 1; Fig. 3, a corresponding section of the machine arranged either for planting or sowing; Fig. 4, a corresponding section of the machine without the drill-standard, opener, and conducting-spout; Fig. 5, a central longitudinal section of the seed-discharger arranged for hill-planting; Fig. 6, a transverse section of the same in the plane indicated by the line *w w*, Fig. 1; Fig. 7, a transverse section of the seed-discharger arranged for drill-planting or sowing, in the plane indicated by the line *y y*, Fig. 3; Fig. 8, a central longitudinal section of the seed-discharger without the flange *d;* Fig. 9, a transverse section of the same in the plane indicated by the line *z z*, Fig. 4.

Like letters designate corresponding parts in all the figures.

The machine is intended to accomplish completely the different kinds of planting and sowing with very slight changes in arrangement to adapt it to each purpose; and the invention relates principally to the construction, arrangement, and operation of the seed-discharger A.

The precise shape of the seed-discharger A is not important, and any variations thereof consistent with the principles of its action, as hereinafter explained, may be made. As its discharge of seed is peripheral, depending either mostly or entirely on centrifugal action to fullfil its proper functions, and as it is most convenient to introduce the seed therein, for some operations at least, through its journal at one end, the best form is found to be substantially that represented in the drawings—to wit, one portion, *c*, thereof being conical and the other portion, *a*, cylindrical, the conical portion extending from one journal to the cylindrical portion. The said cylindrical portion *a* is that through or by which the discharge of the seed is effected and generally regulated. For this purpose of regulating the quantity of seed discharged the following device is generally employed: Another cylinder, *b*, is fitted closely inside of the cylinder *a*, substantially as shown in the drawings. Through the cylinder *a* a set of seed-discharging apertures, *f f*, oblong in their circumferential direction, is formed, and through the cylinder *b* a similar set of apertures, *g g*, is formed, so as to correspond in position with those of the cylinder *a*. A slot, *l*, Figs. 5 and 8, formed in one of the cylinders, and a set-screw, *m*, extending through said slot into the other cylinder till its head binds the two cylinders together, will serve to adjust and hold the cylinders to any relative position required. By causing the one set of holes *g g* to overlap (more or less) the other set, *f f*, as seen in Figs. 5, 6, 7, 8, and 9, the size of the actual discharge-apertures is varied at pleasure.

The method of applying the seed-discharger for planting will be fully understood from a description of the arrangement represented in Figs. 1, 2, 5, and 6. Any convenient form and construction of the frame and other parts of the implement may be employed. The arrangement shown is a suitable one for an ordinary corn-planter. The side beams, B B, are secured to the central beam or pole, C, at the front end, and connected by a cross-bar, H, near the rear end, so that the whole frame has a triangular form. The front end may be supported by the team which draws it, and the rear end by a roller, M, turning in bearings on some standards projecting downward from the side beams, B B.

Longitudinally and centrally within the frame is situated a pivot-beam, D, hinged to the frame in front, as at O, so that its rear end may be moved or adjusted either vertically or horizontally. To the rear end of this pivot-beam is secured the drill-opening standard E, and handles G G for guiding the whole are secured to said pivot-beam and to a stretcher-bar extending through the top of said standard E. A drill-opener, S, is attached to the front side of the standard E, and drill-closers T T are secured to the rear side thereof. The seed is intended to fall between the drill-opener and drill-closer from a conducting-spout, L, pivoted at *r* to the standard E. When the lower end of the spout is swung forward, as shown in the drawings, it is closed by a block or step, *q*, on the back of the standard, and no seed falls out; but at the proper moment for dropping the seed into the ground the upper end of the spout is tilted forward, thus swinging back the lower end and allowing the seed to fall out. This tilting movement of the spout is effected by means of tilting-pins *n n* on the seed-discharger A, and of a cam, *p*, on the upper end of the spout, against which the pins strike. The weight of the spout swings it back to its closed position again. The seed-discharger is represented as arranged to be operated by one hand of the attendant for "check-row" planting, and for this purpose is mounted upon one of the handles G G. A handle, R, for turning the seed-discharger, is inserted therein, and reaches back so as to be conveniently grasped by the hand. The front journal of the seed-discharger turns in a disk or plate, *e*, attached to the handle. A cylindrical flange, *d*, projects back from said disk, so as to closely cover the discharging-apertures *f f* in the cylinder *a* of the seed-discharger, and there is but a single discharge-outlet, *j*, Fig. 6, through this flange, for discharging the seed into a tube, *o*, on one side, whence the seed falls directly into the conducting-spout L. From the highest point of the seed-discharger, on the inside, down as far as the situation of the discharging-outlet *j*, there is also secured to the disk *e* a partial flange or concentric curved plate, *h*, Fig. 6, just inside of the inner adjusting-cylinder, *b*, of the seed-discharger, and a spring-stop, *i*, is attached to said concentric plate, so as to prevent the seed from falling back into the seed-discharger and to force it out through the outlet *j*. As the seed-discharger revolves in the direction indicated by the arrow in Fig. 6 the seed falls into the apertures *g g* at the bottom, and, on the ascending side, fills the apertures *f f* till at the top all falls out, except what there is in the apertures *f f* beyond the union of the apertures *g g* and *f f*. As soon as the apertures pass the curved plate *h* the remaining seed falls forward to the point where the apertures *g g* and *f f* coincide, whence, as they come directly between the final discharge-outlet *j* and the spring *i*, the latter forces the seed out through the said outlet *j*.

Instead of actuating the seed-discharger by hand when "check-planting" is not required, the seed-discharger may be driven by suitable banding from a pulley, *u*, on the shaft of the driving-roller M to its axis or rear journal, and in that case, instead of locating the seed-discharger on one handle, G, it may be located in some other position, so that its axis will not only be horizontal, but in the line of the machine's movement forward; but for the purpose of planting the direction of the handles is sufficiently near to that of the machine's motion.

For the purpose of drill-planting or sowing the arrangement may be the same as that for planting in hills by banding from the pulley *u* on the driving-roller's shaft; but a better arrangement is represented in Figs. 3 and 7. In this case the seed-discharger is located centrally between the sides of the machine, with its axis horizontal, and in the direction of the machine's motion forward. Its rear journal is suspended on or over a transverse roller, P, which is driven at any required speed by a band passing from the pulley *u* to another pulley, V, on one end of the roller itself, and transmits a suitable revolving motion to the seed-discharger by another band, *t*, passing up around the rear journal of said seed-discharger, or by any other convenient method.

The disk *e* is suitably jointed to the pivot-beam D or to the standard E, to allow the required adjustment of the direction and position of the parts. Instead of having the outlet *j* in the flange *d* of the disk *e*, said flange is entirely closed around the apertures *f f*, and the outlet *j* is made through the disk *e*, so as to discharge the seed directly into the conducting-spout L. The latter is also held continually away from the stopper-block *q*, in order that the discharge of seed may be continuous from the seed-discharger to the ground. This arrangement also requires a slight change in the interior of the seed-discharger.

Instead of the concentric plate *h* and spring *i*, as above described, a small hopper-shaped receiver, *h*, Fig. 7, is secured to the disk *e*, formed and situated substantially as shown. The seed falls from the apertures *g g* therein, and is at once discharged through the outlet *j* at the bottom.

When the flange *d* of the disk *e* is entirely dispensed with, the seed passes out directly through the apertures *g g* and *f f* in all directions with a velocity dependent on the force of the seed-discharger, to be regulated according to the breadth of ground required to be sown at once.

For the purpose of planting in hills, and for drill planting and sowing, rings N N, having bevel-shaped peripheries, may be placed on the driving-roller M, as shown in Figs. 1, 2, and 3, so as to leave the ground covered on the hills and drills in a proper shape and condition. They are also useful in turning at the ends of the field or piece of ground.

Instead of regulating the quantity of seed discharged at the periphery of the seed-discharger in sowing seed, it is obvious that the same purpose may be effected by adjusting or varying the flow or passage of seed from the hopper I into the seed-discharger by means of a valve or otherwise.

What I claim as the invention of the said J. H. Bonham, deceased, is—

1. A revolving peripheral seed-discharger having its axis in a horizontal position and in a line with the forward motion of the machine, or in a position suitably approximating thereto.

2. Adjusting the said seed-discharger to different positions approximately to said horizontal and line-of-motion position.

3. In combination with a revolving peripheral seed-discharger having its axis placed as above specified, adjusting or regulating the quantity of seed discharged through the said seed-discharger.

4. The conducting-spout L, in combination with the stopper-block *q* and tilting pins *n n*, arranged and operating substantially in the manner and for the purpose herein specified.

In witness that the above is a true specification of J. H. Bonham's improved machine for planting and sowing corn and other seeds, I hereunto set my hand this 28th day of November, 1859.

A. E. BONHAM,
*Administrator of the estate of J. H. Bonham, deceased.*

Witnesses:
GEO. W. HARE,
JOHN P. HARE.